(12) United States Patent
MacQueen

(10) Patent No.: US 6,841,221 B2
(45) Date of Patent: Jan. 11, 2005

(54) HEAT ACTIVATED COATING TEXTURE

(75) Inventor: Richard C. MacQueen, Phillipsburg, NJ (US)

(73) Assignee: Congoleum Corporation, Mercerville, NJ (US)

(*) Notice: Subject to any disclaimer, the term of this patent is extended or adjusted under 35 U.S.C. 154(b) by 198 days.

(21) Appl. No.: 10/080,353

(22) Filed: Feb. 20, 2002

(65) Prior Publication Data

US 2003/0162014 A1 Aug. 28, 2003

(51) Int. Cl.⁷ .................................. B32B 5/16
(52) U.S. Cl. .............. 428/141; 428/156; 428/158; 428/159; 428/332; 428/402.2; 428/403; 524/284; 524/293; 524/294; 525/51; 525/54; 525/142; 525/143; 525/227; 525/239
(58) Field of Search .................. 428/332, 141, 428/156, 158, 159, 402.2, 403; 524/284, 235, 234, 283; 525/227, 239, 51, 54, 142, 143

(56) References Cited

U.S. PATENT DOCUMENTS

| | | | |
|---|---|---|---|
| 4,234,641 A | * | 11/1980 | Thompson et al. .......... 428/159 |
| 5,543,207 A | * | 8/1996 | Heighington et al. ....... 428/207 |
| 5,665,785 A | * | 9/1997 | McClellan et al. ........... 521/51 |

* cited by examiner

*Primary Examiner*—Ieszek Kiliman
(74) *Attorney, Agent, or Firm*—Morgan, Lewis & Bockius LLP

(57) ABSTRACT

A process for making a textured coating on a substrate and compositions for such coatings are disclosed wherein coating mixtures comprising un-expanded micro-capsules and a plastisol or other suitable resins are applied to the substrate and subsequently heat treated to expand the micro-capsules within the coating. The expanded micro-capsules create an aesthetically pleasing surface texture in the coating while retaining the desired wear-resistant properties of the coating.

23 Claims, 8 Drawing Sheets

(a)

(b)

(c)

(a)

(b)

(c)

HEAT ACTIVATED COATING TEXTURE

FIELD OF THE INVENTION

The present invention generally relates to a covering having a surface texture and method of making the same. More specifically, the present invention relates to coating compositions containing thermally expandable micro-balloons that produce a textured covering with improved aesthetic and abrasion resistant properties.

BACKGROUND OF THE INVENTION

Surface covering materials, especially covering materials used in flooring, should have aesthetic appeal in addition to meeting several functional requirements. In order to meet the often antagonistic functional requirements, surface covering materials are often layered composite structures wherein each layer provides for one or more of the desired functional properties. For example, the top layers of the surface covering provide stain and wear resistance but must also provide for visually appealing patterns or designs. The top layers may include a top, transparent or translucent, wear layer that imparts wear resistance to the surface covering and an underlying decorative layer containing an aesthetically pleasing design or texture. Intermediate layers of the surface covering, not directly visible, may include a high compliance layer providing for a "cushioning" effect but may also be used to provide for embossed relief designs for the surface covering. The bottom layers of the surface covering may be used to incorporate dimensional stability, tear resistance, and strength to the surface covering material.

It is known that the incorporation of small particles into the decorative layer of a surface covering enhances the aesthetic appeal of the surface covering. For example, U.S. Pat. No. 5,627,231 ('231) filed Aug. 11, 1994 and herein incorporated by reference in its entirety, disclosed the incorporation of methacrylate particles into a PVC wear layer. The '231 patent also disclosed the swelling of the methacrylate particles caused by absorption of plasticizer into the particles during the gellation of the PVC wear layer. Although the '231 patent describes the swelling of the methacrylate particles as "substantial" the competition between the methacrylate and PVC particles for the plasticizer limited the swelling of the methacrylate particles. In addition, swelling of the methacrylate particles reduced the amount of swelling of the PVC particles, thereby affecting the thickness of the wear layer. Furthermore, the swelled methacrylate particles became sticky and soft and compromised the top coat. The resulting top coat exhibited poor wear characteristics and was more susceptible to dirt pick-up.

Therefore, there still remains a need to provide a coating composition having a surface texture with improved aesthetic and abrasion resistant properties and to provide a method for manufacturing such coatings.

SUMMARY OF THE INVENTION

One embodiment of the present invention is a process for making a textured coating on a substrate, the process comprising the steps of: mixing a plurality of thermally expandable micro-capsules into a coating composition; applying said coating composition onto a substrate to produce an applied coating composition having a thickness sufficient to cover said micro-capsules; heating said applied coating composition, thereby expanding said micro-capsules such that at least a portion of said micro-capsules protrudes from said applied coating composition to produce a texture; and curing said applied coating composition to produce a cured coating.

Another embodiment of the present invention is a coating mixture that cures to a texture, the mixture comprising a surface coating composition and a plurality of micro-capsules, each micro-capsule having a polymer shell encapsulating a blowing agent.

Another embodiment of the present invention is a textured coating, the textured coating comprising a surface coating and a plurality of thermally expanded micro-balloons with a polymer shell and expanded gas, wherein at least some of said micro-balloons protrude above said surface coating resulting in a texture.

Another embodiment of the present invention is a method of making a textured coating on a substrate, the method comprising the steps of providing a coating mixture comprising un-expanded micro-capsules dispersed in a carrier, applying the mixture onto a substrate to form a streak-free coating surface, and expanding the micro-capsules to form a textured coating.

Another embodiment of the present invention is a heat-activated coating composition, the composition comprising a liquid carrier; and a plurality of micro-capsules dispersed in the liquid carrier, each of the plurality of the micro-capsules comprising a blowing agent encapsulated by a thermoplastic resin that forms a substantially gas impermeable barrier enclosing the blowing agent.

Another embodiment of the present invention is a textured coating, the textured coating comprising a surface coating characterized by a coating thickness and a plurality of expanded micro-capsules characterized by a diameter, wherein the coating thickness is less than the diameter of the expanded micro-capsules.

Another embodiment of the present invention is a textured coating, the textured coating comprising a surface coating having a top surface and characterized by a coating thickness and a plurality of expanded microcapsules characterized by a diameter, wherein the coating thickness is less than five times the diameter of the expanded micro-capsules and at least one of the plurality of expanded micro-capsules protrude from the top surface of the surface coating.

BRIEF DESCRIPTION OF THE DRAWINGS

The desired objects and features of the present invention will become apparent from the following description in which the preferred embodiments are set forth in detail in conjunction with the accompanying drawings in which.

DETAILED DESCRIPTION OF THE PREFERRED EMBODIMENTS

Unless otherwise defined, all technical and scientific terms used herein have the same meaning as commonly understood and/or used by one of ordinary skill in the art to which this invention belongs.

All publications, patent applications, patents or other references which are mentioned herein are incorporated by reference in their entirety. In case of conflict, the present application, including definitions, will control. In addition, the materials, methods, and examples are illustrative only and not intended to be limiting.

Figure 1:
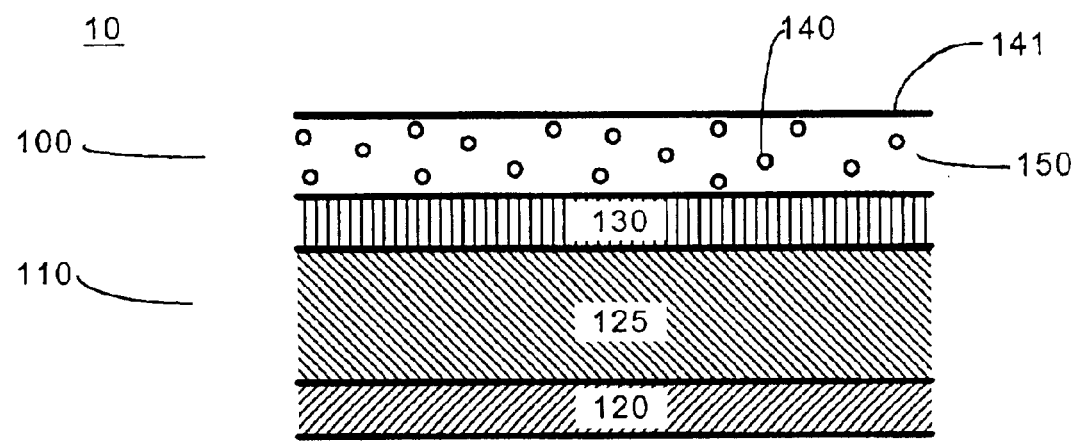
FIG. 1a is a schematic diagram of one embodiment of the present invention prior to heat activation.
FIG. 1b is a schematic diagram of the embodiment shown in FIG. 1 a after heat activation.
FIG. 1c is a schematic diagram of another embodiment of the present invention after heat activation.
Figure 1:
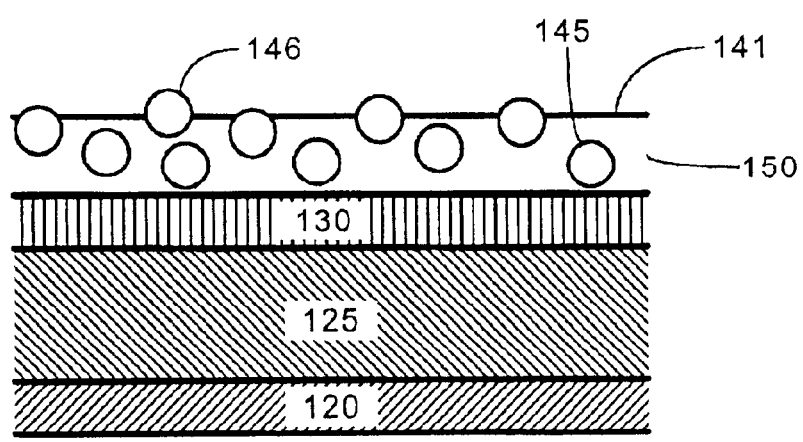
Figure 1:
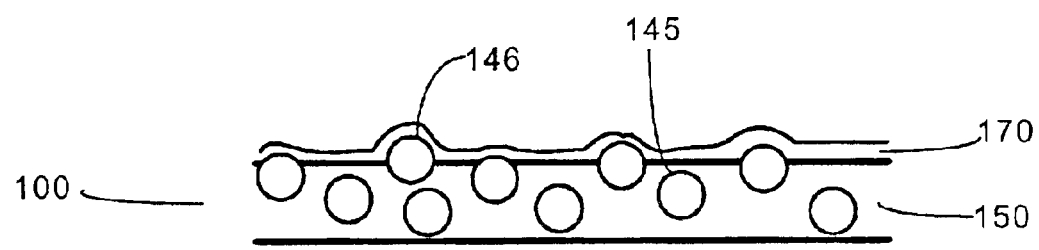

FIG. 1*a* is a schematic diagram of an embodiment of the present invention prior to heat activation. In a preferred embodiment, a heat activated coating 100 forms a top layer over a substrate 110 wherein the coating 100 and substrate 110 together form a surface covering 10. As used herein, "bottom surface" refers to the face of the surface covering facing the surface to be covered and "top surface" refers to the exposed face of the surface covering.

Substrate 110 includes one or more layers 120, 125, 130 with each layer bonded, fused, or adhered to its adjacent layers thereby forming a monolithic substrate. Each layer imparts one or more desirable properties to the surface covering. For example, substrate 110 may include a backing layer 120, a base layer 125, and an ink layer 130. Each layer is optional and other layers having different or combined functionalities, as is apparent to one of skill in the art, may be incorporated into the substrate 100. Backing layer 120 imparts dimensional stability, tear resistance, and strength to the surface covering material. The backing layer may be woven or a sheet of resinous composite material. The resinous composite material may include short length reinforcing fibers, filler material, and a resinous binder. An example of a backing layer is disclosed in U.S. Pat. No. 5,736,008 filed on Apr. 8, 1993 and herein incorporated by reference in its entirety.

Base layer 125 may be a compliant layer of foamed resinous material that imparts an embossed relief design into the surface covering while giving the surface covering a "cushioning" effect. The base layer 125 may be a mixture of resinous material and a blowing agent applied to the backing layer 120. The blowing agent may be a liquid or solid when mixed with the resinous material but is converted to a gas by application of heat to the base layer 125. The production of gas in the base layer 125 causes the layer to expand due to the formation of gas bubbles or pockets within the base layer 125 from the decomposition of the blowing agent. The gas bubbles or pockets create a relatively high compliance material that gives the surface covering a "cushioning" effect.

An embossed or relief effect may be produced in the base layer 125 by selectively printing blowing agent accelerants or inhibitors onto the ink layer 130 adjacent to the base layer 125 prior to the expansion of the blowing agent. Inhibitors increase the decomposition temperature of the blowing agent thereby decreasing the expansion of the base layer 125. Conversely, accelerants decrease the decomposition temperature of the blowing agent thereby increasing the expansion of the base layer 125. Examples of base layer compositions and methods of making the base layer are disclosed in U.S. Pat. No. 5,733,630 filed Jun. 7, 1995 and in U.S. Pat. No. 3,293,094 filed Dec. 20, 1965, both of which are herein incorporated by reference in their entirety.

In an alternate embodiment, the surface covering does not include a substrate 110. Instead, the heat activated coating is applied to a temporary form having a non-adherent surface or coated with a release agent such that the heat activated coating can be separated from the temporary form after the coating has been activated and cured.

The heat activated coating 100 of the present invention is shown as the top-most layer of the surface covering 10 and therefore functions as a wear layer in addition to providing an aesthetically pleasing texture. The heat activated coating 100 comprises a plurality of micro-capsules 140 mixed or dispersed in a carrier 150. FIG. 1*a* shows the heat activated coating 100 prior to heat activation. The heat activated coating 100 prior to heat activation has a smooth surface 141 and micro-capsules in its un-expanded state.

FIG. 1*b* is a schematic diagram of the embodiment shown in FIG. 1*a* after heat activation and shows the micro-capsules in their expanded state 145. FIG. 1*b* indicates that some of the expanded micro-capsules 145 extend or protrude above or beyond the original surface 141 of the heat activated coating 100. The protruding micro-capsules 146 impart a rough or bumpy surface texture to the coating that is aesthetically pleasing. The rough surface texture increases the surface friction of the coating and gives the coating increased slip resistance for objects moving in contact with the surface covering.

FIG. 1*c* is a schematic diagram of another embodiment of the present invention after heat activation showing the heat activated coating without an underlying substrate.

FIG. 1*c* also illustrates the use of an optional top, or wear, layer 170 disposed on top of the heat activated coating. The wear layer 170 increases the wear, stain, and scratch resistance of the surface coating as well as providing an environmental barrier for the heat activated coating. The wear layer 170 is preferably a thermosetting polymer, more preferably a polyurethane composition, and most preferably a UV-curable polyurethane composition. For example, a urethane acrylate top coat such as the Photoglaze® coating from Lord Corporation, Cary, N.C. may be used as a top coat. In other embodiments, the wear layer 170 may include polyvinyl chloride (PVC) compositions as described in U.S. Pat. No. 5,830,937 filed May 25, 1993 and herein incorporated by reference in its entirety. The optional wear layer may also be applied to the embodiment shown in FIG. 1*b*.

The composition of the heat activated coating includes micro-capsules dispersed in a liquid carrier. The concentration of micro-capsules in the coating composition is preferably between 0.1–10 wt. %. As described below, the texture of the coating may be controlled by varying the micro-capsule concentration. Therefore, the selection of the micro-capsule concentration may be determined without undue experimentation by one of skill in the art to achieve the desired texture in the coating.

The carrier may be any liquid or particulate dispersion capable of dispersing or suspending the micro-capsules in a substantially uniform homogeneous suspension and of forming a solid layer or surface coating. The carrier may also include fugitive agents that are removed after the liquid coating is applied to a substrate.

In one embodiment, the carrier is a thermoplastic coating. In a preferred embodiment, the thermoplastic coating is a plastisol. As used herein, a plastisol is a substantially uniform, homogeneous suspension or dispersion of fine polymeric solids in a liquid plasticizer. The conversion of a liquid plastisol into a solid, cohesive structure is characterized by two distinct temperature ranges.

The "gelation temperature range" is the temperature range wherein the fine polymeric solids dispersed in the liquid plasticizer swell from the diffusion of plasticizer into the polymeric solid particles. The diffusion of plasticizer into the polymeric particles increases the viscosity of the liquid plastisol until a semi-rigid or gel structure (i.e., the structure can withstand a non-zero shear stress) is formed. The gelled plastisol is substantially dry but has little or no cohesive strength.

The "fusion temperature range" is the temperature range wherein the gelled plastisol is "fused" together to form a surface coating having a cohesive structure. Typically, the fusion temperature range is above the gelation temperature range.

The gelation temperature range and fusion temperature range may be varied by the choice of the plasticizer and polymeric solid. Selection of a plasticizer and polymeric solid for a particular gelation temperature range or particular fusion temperature range may be accomplished by one of skill in the art without undue experimentation. In a preferred embodiment, the plastisol is a polyvinyl chloride (PVC) plastisol such as the compositions described in the '231 patent.

In another embodiment, the carrier may be a radiation curable, thermosetting coating. In another embodiment, the carrier may be a thermally-curing, thermosetting coating such as the exemplar composition described in Example 5 below.

Micro-capsules comprise a blowing agent encapsulated with a thermoplastic resin that forms a substantially gas impermeable barrier enclosing the blowing agent. Micro-capsules are also referred to as micro-balloons or micro-spheres. Micro-capsules are characterized by an expansion temperature range. When the micro-capsules are heated into the expansion temperature range, the blowing agent evolves gas thereby pressurizing the thermoplastic shell. The thermoplastic shell softens and expands under the pressure generated by the blowing agent creating an expanded micro-capsule having a volume ratio (ratio of the final micro-capsule volume to the initial micro-capsule volume) between 5–200 and preferably between 20–100.

The expansion temperature range may be adjusted by selection of the blowing agent and thermoplastic resin comprising the polymer shell. The blowing agent and thermoplastic resin are selected such that the temperature where the blowing agent begins to evolve gas (either by vapor phase transition or chemical decomposition) and the glass transition temperature of the thermoplastic resin are within the expansion temperature range. Additional selection criteria, such as chemical compatibility of the polymer shell with its environment, may be used to narrow the selection as is known to one of skill in the art. In a preferred embodiment, the thermoplastic resin is an acrylonitrile-polyvinylidene fluoride copolymer and the blowing agent is a hydrocarbon such as, for example, isobutane or isopentane. In one embodiment, micro-capsules have an expansion temperature range between 100–200° C. In a preferred embodiment, the expanded micro-capsules are substantially hollow spheres with intact shells that act as a barrier to liquid or dirt ingress into the hollow spheres.

Micro-capsules having a variety of expansion temperature ranges and un-expanded particle sizes are available as the Micropearl™ thermoexpandable micro-capsules available from Pierce & Stevens Corp. of Buffalo, N.Y. or as the Expancel® DU microspheres available from Expancel Inc. of Duluth, Georgia.

In a preferred embodiment, micro-capsules have a particle size between 5–80μm and an expansion temperature range below or overlapping the gelation temperature range of the plastisol.

Figure 2:
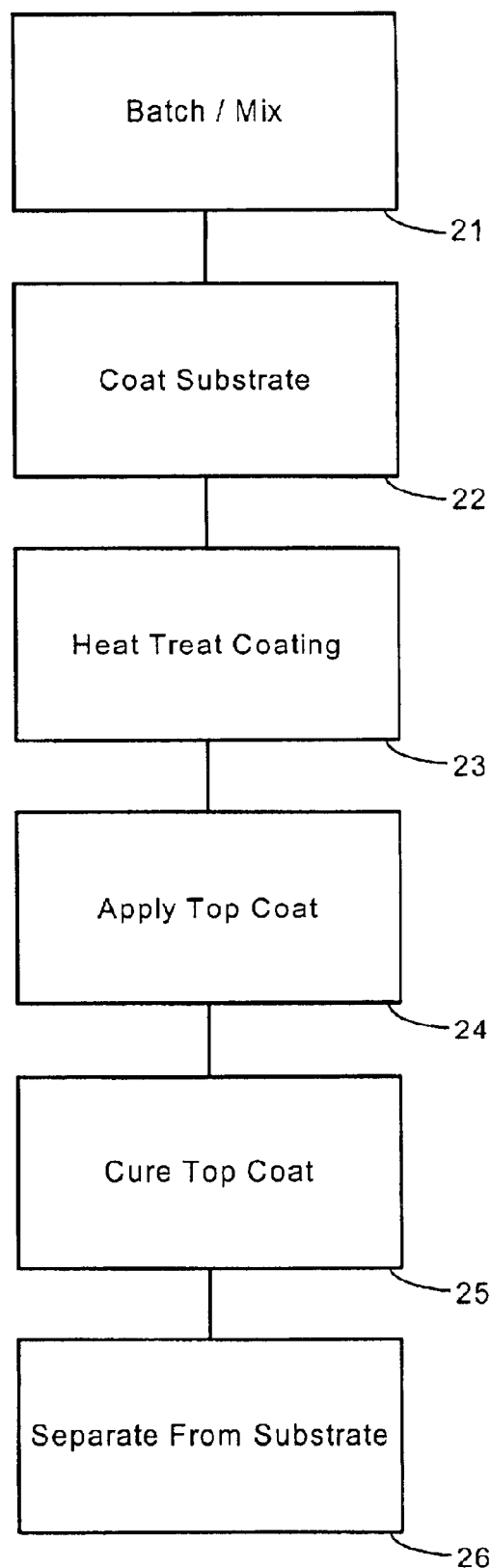
FIG. 2 is a flow diagram of another embodiment of the present invention.

FIG. 2 is a flow diagram of another embodiment of the present invention producing the coating of FIG. 1c. The liquid coating mixture is batched and mixed in step 21 using a mixer as known to one of skill in the art. The batching may be automated and/or continuous and sized to match the production rate of the coating. In one embodiment, a high shear mixer is used to mix the coating composition.

In step 22, the mixed coating composition is applied to a substrate to produce a wet coating layer. The substrate, for example, may be a gelled PVC substrate if a permanent attachment to the substrate is desired. In another embodiment, the substrate may be silicon rubber if a free-standing textured coating is desired. The mixed coating composition may be applied to the substrate using any of the known methods and devices to produce a coating. Examples of coating equipment for the application of the coating layer include, without limitation, air knife, roll coater, curtain coater, knife-over-roll coater, reverse roll coater, and draw-down bar.

The thickness of the wet coating is controlled by the coating equipment. In a preferred embodiment, the wet coating thickness is greater than the diameter of the micro-capsules in the coating mixture. The wet coating thickness may also depend on the composition of the coating mixture. In one embodiment, a wet coating thickness of 10–100 μm is used for a radiation-curable coating composition. In another embodiment, a wet coating thickness of 10–50 mils (0.25–1.25 mm) may be used for a PVC plastisol composition.

The advantage of incorporating un-expanded micro-capsules into the coating mixture is that the relatively small particle size of the un-expanded micro-capsules allow for greater flexibility in the choice of coating equipment and for greater flexibility in selecting the wet coating thickness. The relatively small initial particle size of the un-expanded micro-capsules permit the use of roll coaters that would leave streaks in the coating if the particle size was greater than the coating thickness. In order to prevent streaks, the layer thickness should be 2–3 times the diameter of the largest particles incorporated into the coating composition, which, in turn, may be 2–3 times the size of the median or average particle diameter. Therefore, minimum layer thicknesses to prevent streaking are usually greater than 10 times the diameter of the median particle incorporated into the coating composition. Conversely, the use of micro-capsules enables the application of thin coating layers without streaking.

In step 23, the coating is heat treated to develop a texture by expanding the un-expanded micro-capsules in the coating layer. Heat treatment equipment may include, by way of example, tunnel or roller ovens or other suitable equipment known to one of skill in the art. The heat treatment may include one or more distinct temperature treatments with each temperature treatment having a distinct duration or may include a continuous time-varying temperature profile. In one embodiment, the coating layer may undergo a first heat treatment at a temperature sufficient to expand the micro-capsules while gelling the PVC plastisol followed by a second heat treatment at a temperature sufficient to fuse the gelled plastisol. In another embodiment, the coating layer is exposed to a temperature sufficient to fuse the plastisol but of short duration such that the micro-capsules do not shrink from overheating. Selection of the optimum heat treatment profile will depend on the composition of the coating layer and on the desired texture and may be determined by one of skill in the art without undue experimentation.

The advantage of incorporating expandable micro-capsules into the coating mixture is that the coating texture may be developed after the coating layer has been deposited on the substrate. As discussed above, the size of the un-expanded micro-capsules allows for greater flexibility and control during the deposition of the coating layer onto the substrate and also allows for thinner coating layers while avoiding streaking. After the coating layer is deposited, the micro-capsules are expanded by heat treatment 23. The expansion of the micro-capsules cause some of the micro-capsules to protrude above the surface of the coating layer. The protrusion of the micro-capsules above the coating surface creates the desired texture in a streak-free relatively (with respect to the expanded diameter) thin textured surface. The large volume increase (of the micro-capsules In step 24, atop wear coat is applied to the textured coating layer. The application of a top wear coating is optional but may be applied to impart greater scratch or stain resistance to the surface covering. In one embodiment, the wear coating composition is a thermosetting polymer, preferably a radiation-curable polymer. The wear coating composition should also have a relatively low viscosity such that the wear coating composition can substantially cover the textured coating layer. In a preferred embodiment, the wear coating composition has a viscosity in the range between 50–1000 cPs (50–1000 mPa-s). The top wear coating may be applied using equipment similar to the equipment used to apply the coating layer in step 22. In one embodiment, an air knife is used to apply a UV-curable urethane top wear coating. In another embodiment, the top wear coating thickness is between 25–40 μm.

In step 25, the top wear coating is cured using equipment and methods known to one of skill in the art. In one embodiment, a two-step curing process (a first curing step under an air environment followed by a second curing step under a nitrogen atmosphere) is used to cure the top wear layer.

In step 26, the silicon rubber substrate is separated from the textured coating layer to form a free-standing textured surface covering.

The invention having been described, the following examples illustrate various embodiments and features of the present invention. It should be appreciated that the following examples are presented to illustrate, rather than to limit, the scope of the invention.

EXAMPLE 1

The effect of concentration and type of micro-capsules on the texture of thermoplastic coatings are illustrated in this example. Micro-capsules such as Micropearl™ F30D, F50D, F805D1, and F100D1, available from Pierce & Stevens, Buffalo, N.Y., were mixed with PVC plastisols. The PVC plastisol compositions are as described in the '231 patent. Table 1 summarizes chemical and mechanical properties of the micro-capsules used in this example.

TABLE 1

Properties of Micropearl ™ Micro-Capsules

| Name | Shell Composition | Diameter (μm) | Expansion Temperature (° F.) |
|---|---|---|---|
| F30D | polyvinylidene chloride copolymer | 10–20 | 248–284 |
| F50D | polyvinylidene chloride copolymer | 10–20 | 284 |
| F80SD1 | acrylonitrile copolymer | 16–32 | 320–338 |
| F100D1 | acrylonitrile copolymer | 16–32 | 356–374 |

Micro-capsules were added at concentrations ranging from 1 to 10 wt. % to each of the liquid plastisols and mixed in a Cowles blade mixer at room temperature. The mixtures were applied to a gelled PVC substrate using a 10 mil draw bar and produced smooth wet coatings. The coatings were heated or gelled in an oven at about 385° F. for 1.5 minutes. Control coatings of the plastisols without micro-capsules were prepared, coated, and gelled under the same conditions as the coatings containing the micro-capsules.

The surfaces of the gelled coatings were evaluated by three methods: visual observation, Scanning Electron Microscopy (SEM), and gloss measurements. Visual observations identified and distinguished smooth coatings from coatings having macroscopic texture. SEM images detected both macroscopic and microscopic texture in the gelled coatings and provided a qualitative ranking of the macroscopic and microscopic texture of the coatings based, for example, on the number and size of the micro-capsules. Gloss measurements provided a quantitative ranking of each coating. Coatings with a lower gloss value were considered to have a more aggressive texture. Gloss values were measured at 60° F. with a BKK Gardner No. 4501 gloss meter. The measured gloss values could not distinguish between macroscopic texture and microscopic texture because both types of texture scatter light.

Figure 3:
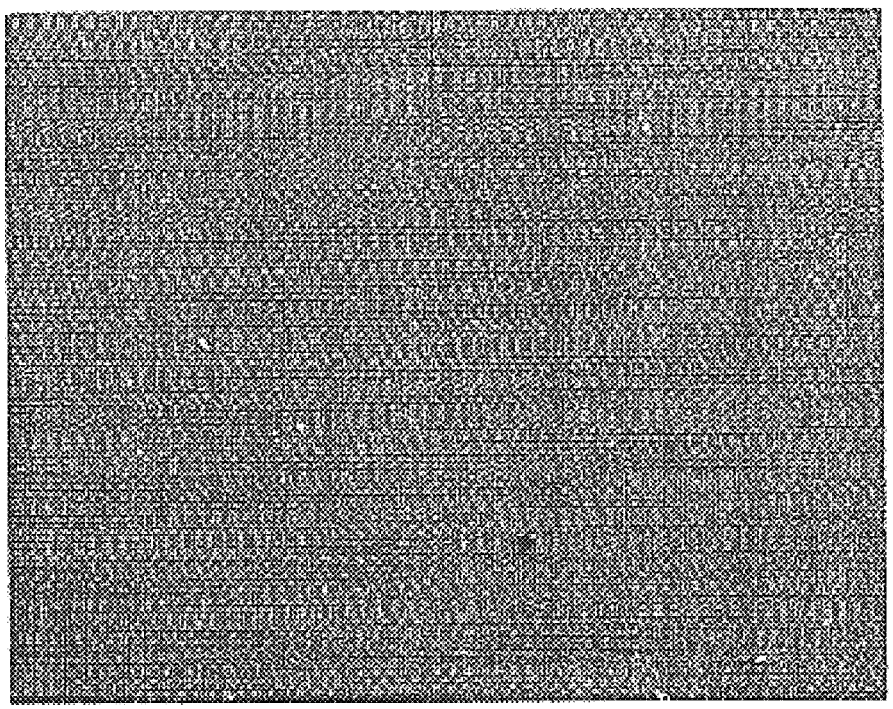
FIG. 3 is a SEM image of a wear layer without microcapsules according to the present invention.
Figure 4:
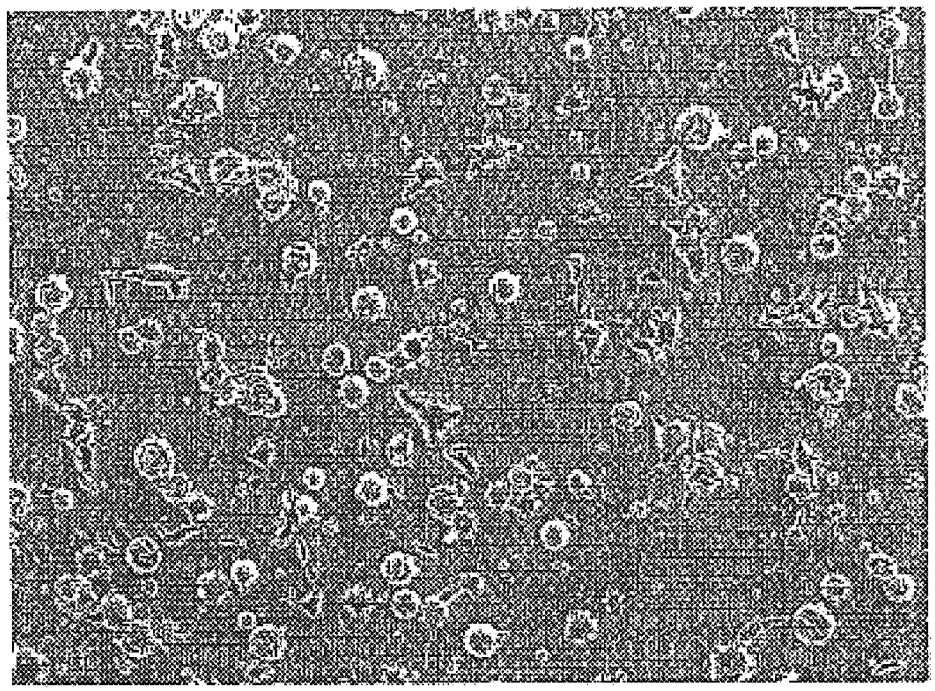
FIG. 4 is a SEM image of a wear layer with 1% F80SD1 micro-capsules according to the present invention.
Figure 5:
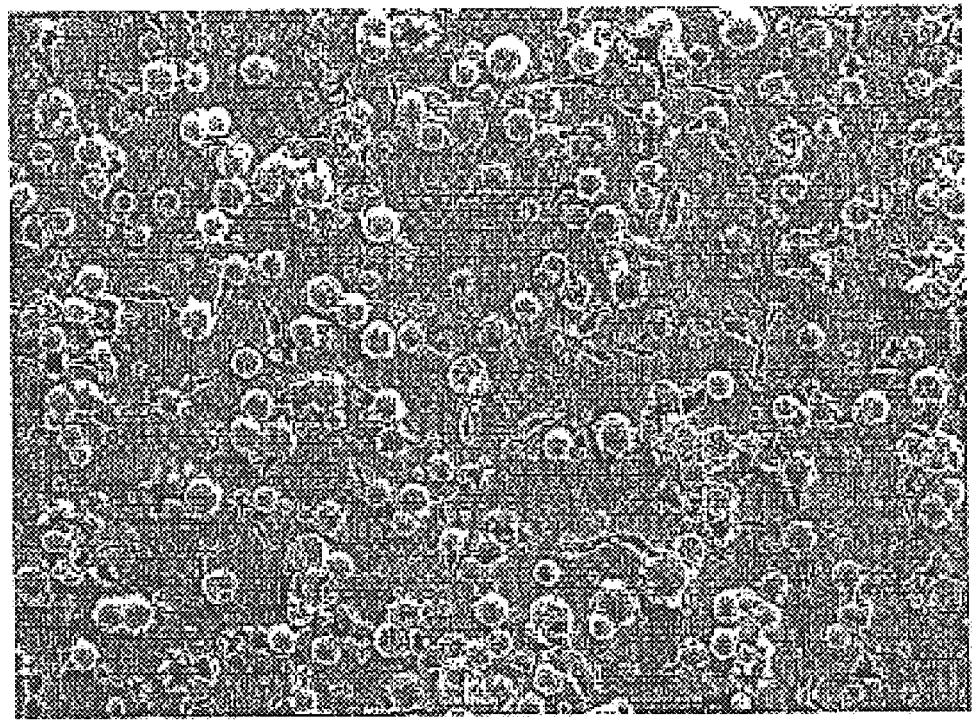
FIG. 5 is a SEM image of a wear layer with 2% F80SD1 micro-capsules according to the present invention.
Figure 6:
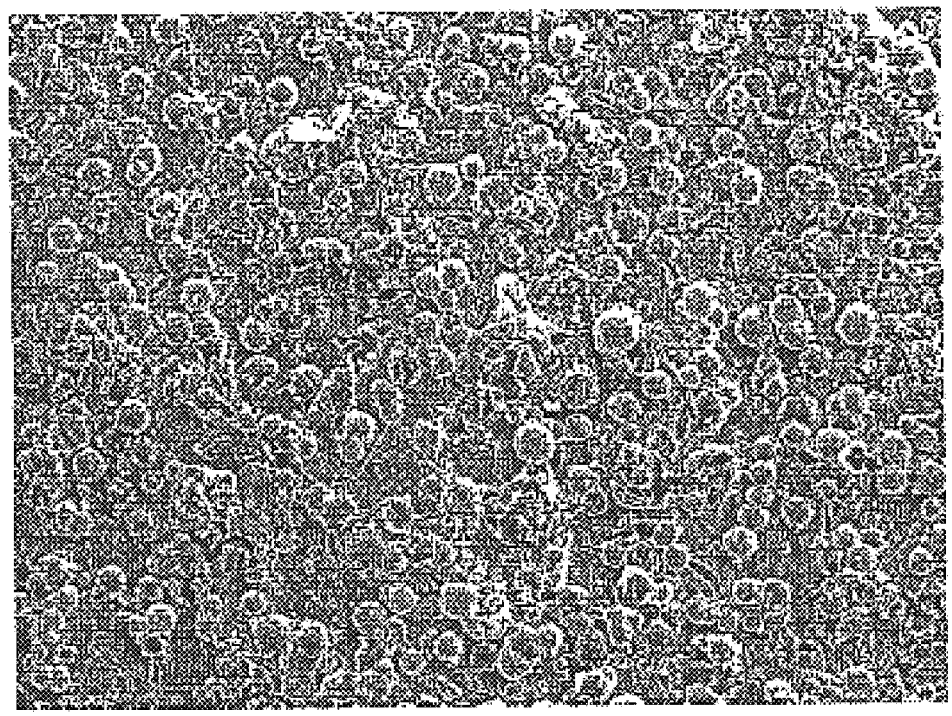
FIG. 6 is a SEM image of a wear layer with 4% F80SD1 micro-capsules according to the present invention.
Figure 7:
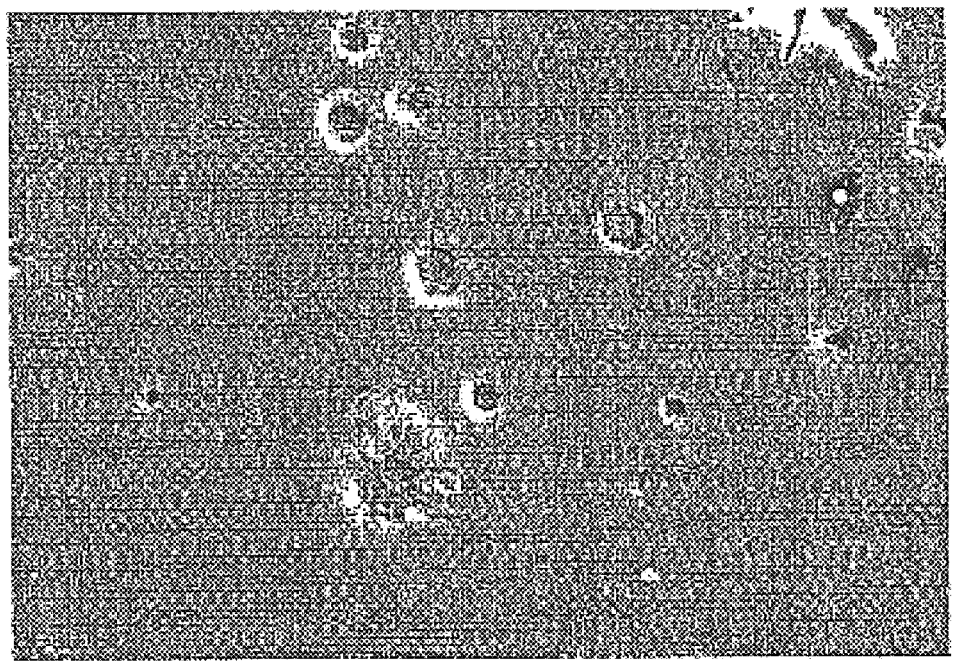
FIG. 7 is a SEM image of a wear layer with 1% F30D micro-capsules according to the present invention.

Table 2 summarizes the textural characteristics of the coatings evaluated by visual observations and by the gloss measurements. SEM images of coatings containing varying amounts of micro-capsules are shown in FIGS. 3–8 wherein: FIG. 3 contains no micro-capsules; FIG. 4 contains 1 wt % F80SD1 micro-capsules; FIG. 5 contains 2 wt % F80SD1 micro-capsules; FIG. 6 contains 4 wt % F80SD1 micro-capsules; FIG. 7 contains 1 wt % F30D micro-capsules; and FIG. 8 contains 4 wt % F30D micro-capsules.

TABLE 2

Effects of Type and Concentration of Micro-Capsules on Texture of Various Coatings

| wt % Micro-Capsules | Type of Micro-Capsules | Visual Texture | Gloss (%) |
|---|---|---|---|
| 0 | N/a | Smooth | 50 |
| 1 | F30D | Smooth | 34 |
| 1 | F50D | Smooth | 21.4 |
| 1 | F80SD1 | Ceramic | 9 |
| 1 | F100D1 | Ceramic | 5.8 |
| 2 | F80SD1 | Ceramic | 4.2 |

TABLE 2-continued

Effects of Type and Concentration of Micro-Capsules on Texture of Various Coatings

| wt % Micro-Capsules | Type of Micro-Capsules | Visual Texture | Gloss (%) |
|---|---|---|---|
| 4 | F80SD1 | Ceramic | 2.3 |
| 4 | F30D | Smooth | 11 |

Table 2 and FIGS. 3–8 confirm the expansion of the micro-capsules during the gelling process in all of the sample coatings and demonstrate the dependence of both macroscopic and microscopic texture on micro-capsule type and concentration.

F80SD1 and F100D1 micro-capsules produced coatings exhibiting visually macroscopic ceramic-like textures with reduced gloss values. Coatings containing F30D or F50D micro-capsules, however, did not exhibit visually macroscopic texture but were accompanied by lower gloss values thereby indicating the presence of microscopic texture such as matting.

Low (44×) magnification SEM images of the coatings containing F80SD1 micro-capsules in FIGS. 3–6 show that the micro-capsules have expanded to about 100 μm while remaining intact. As the concentration of expanded micro-capsules increased, the areal density of expanded micro-capsules on the coating surface increased. The SEM images shown in FIGS. 3–6 agreed with visual observations and gloss value measurements that indicated an increasing degree of coating texture as the concentration of micro-capsules in the coating mixture increased.

Figure 8:
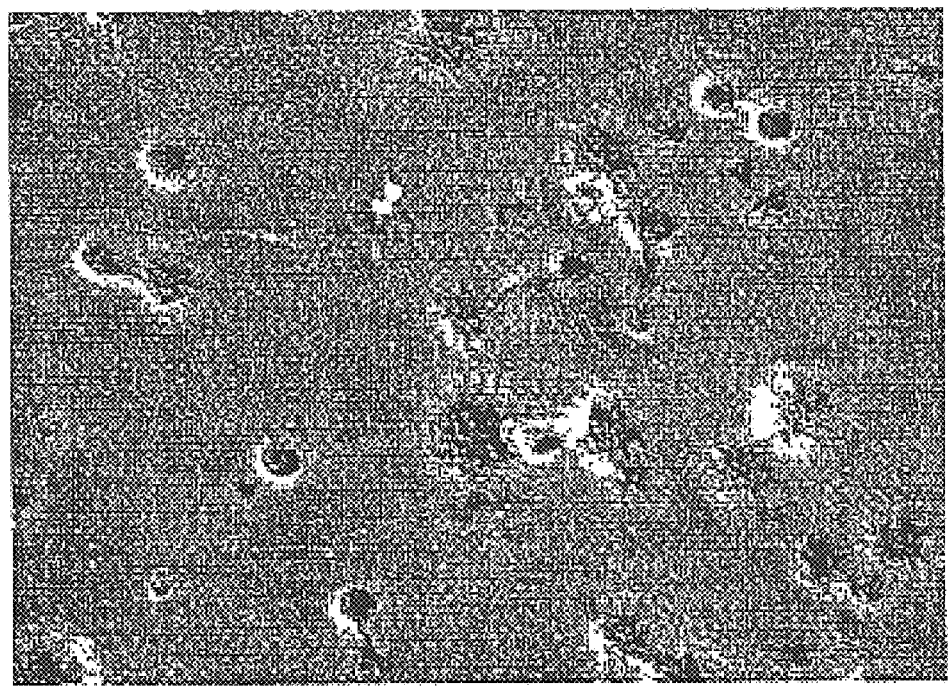
FIG. 8 is a SEM image of a wear layer with 4% F30D micro-capsules according to the present invention.

High (600×) magnification SEM images of the top surface of coatings containing 1 wt % and 4 wt % F30D micro-capsules are shown in FIGS. 7 and 8, respectively. The absence of micro-capsules in FIGS. 7 and 8 suggest that the micro-capsules exploded, leaving craters in the coatings. The craters formed by the exploded micro-capsules created a microscopic surface texture that visually appeared as a matte-like finish. As the concentration of F30D micro-capsules increased, the measured gloss value of the coating decreased. The explosion of the F30D micro-capsules maybe attributed to the lower expansion temperatures of 248–284° F. for the F30D micro-capsules relative to expansion temperatures of 320–338° F. for the F80SD1 micro-capsules and the gelling temperature of 385° F. used to make the coatings in this example. The large temperature difference between the F30D expansion temperature and the gelling temperature may have accelerated the pressure build-up of the blowing agent contained in the micro-capsule such that the micro-capsule shell ruptured.

EXAMPLE 2

This Example demonstrates the effects of the expansion temperature on the surface texture of thermoplastic coatings. Micro-capsules were mixed with the plastisol and coated onto a gelled PVC substrate following the same procedure as in Example 1. The coated substrates were divided into three groups and each group of coated substrates was gelled a t either 300° F., 345° F., or 385° F. The surface texture of the gelled coatings was evaluated by visual observation, SEM images, and gloss measurements following the same procedure as in Example 1.

Table 3 summarizes the coating textures evaluated by the visual observations and the gloss measurements. In Table 3, the % Gloss Change was calculated relative to the control coatings containing no micro-capsules and having the same gel temperature as the coating. This was done in order to compensate for the effect of gel temperature on surface gloss.

TABLE 3

Effect of Gel Temperature and Micro-capsule Concentration on Coating Texture

| % Micro-Capsules | Type of Micro-Capsules | Expansion Temp. (° F.) | Visual Texture | Gloss (%) | % Gloss Change |
|---|---|---|---|---|---|
| 0 | None | 300 | Smooth | 28 | — |
| 0 | None | 345 | Smooth | 45 | — |
| 0 | None | 385 | Smooth | 50 | — |
| 1 | F100D1 | 300 | Smooth | 22.4 | 20 |
| 1 | F100D1 | 345 | Ceramic | 6.6 | 85 |
| 1 | F100D1 | 385 | Ceramic | 5.8 | 88 |
| 1 | F80SD1 | 300 | Ceramic | 10 | 64 |
| 1 | F80SD1 | 345 | Ceramic | 7 | 84 |
| 1 | F80SD1 | 385 | Ceramic | 9 | 82 |
| 2 | F80SD1 | 300 | Ceramic | 5.1 | 82 |
| 2 | F80SD1 | 345 | Ceramic | 3.5 | 92 |
| 2 | F80SD1 | 385 | Ceramic | 4.2 | 92 |
| 4 | F80SD1 | 300 | Ceramic | 2.3 | 92 |
| 4 | F80SD1 | 345 | Ceramic | 2.2 | 95 |
| 4 | F80SD1 | 385 | Ceramic | 2.3 | 95 |
| 1 | F50D | 300 | Ceramic | 8.3 | 70 |
| 1 | F50D | 345 | Ceramic | 15.4 | 66 |
| 1 | F50D | 385 | Smooth | 21.4 | 57 |
| 1 | F30D | 300 | Smooth | 17.3 | 38 |
| 1 | F30D | 345 | Smooth | 27 | 40 |
| 1 | F30D | 385 | Smooth | 34 | 32 |
| 4 | F30D | 300 | Smooth | 6.1 | 78 |
| 4 | F30D | 345 | Smooth | 9 | 80 |
| 4 | F30D | 385 | Smooth | 11 | 78 |

Figure 9:
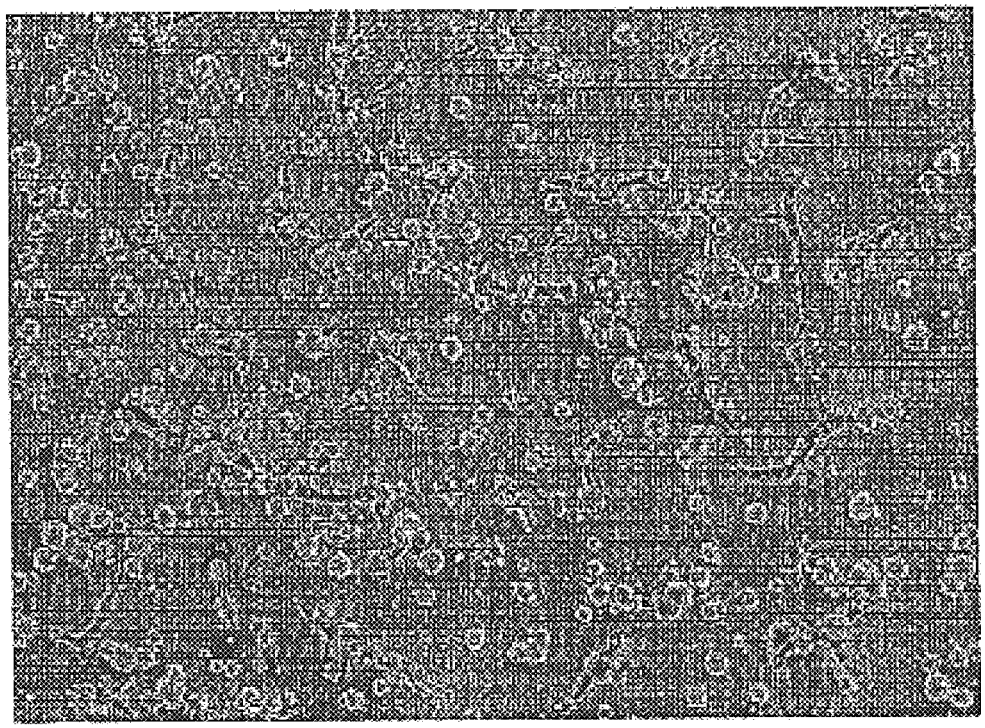
FIG. 9 is a SEM image of a wear layer with 2% F80SD1 micro-capsules according to the present invention.
Figure 10:
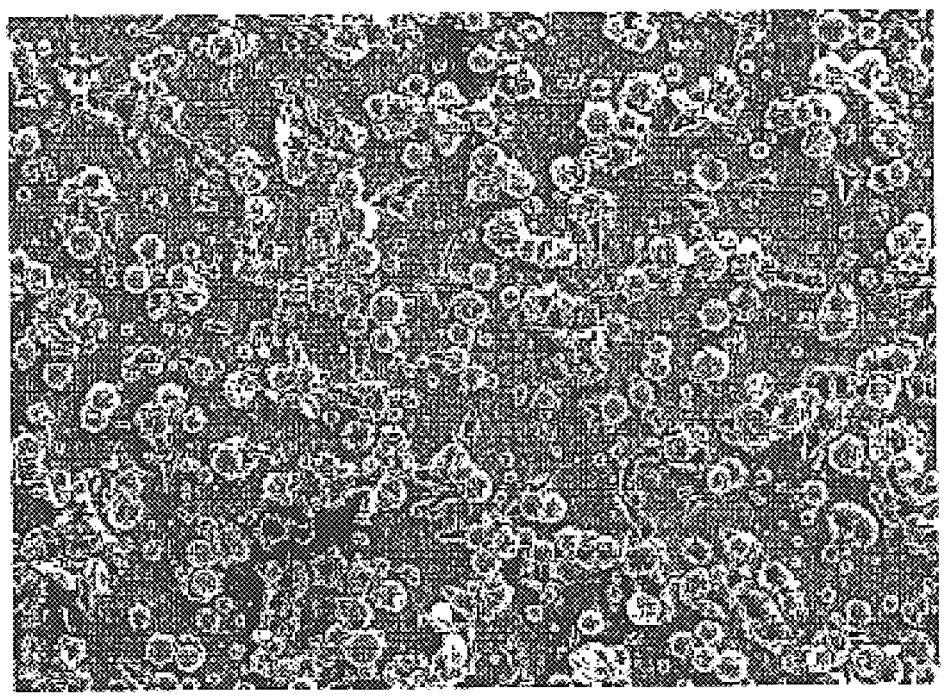
FIG. 10 is a SEM image of a wear layer with 2% F80SD1 micro-capsules according to the present invention.

FIG. 9 is an SEM image of the coating containing 2 wt % F80SD1 micro-capsules gelled at 300° F. FIG. 9 shows that the micro-capsules have not fully expanded and are less than 100 μm in diameter. FIG. 10 is an SEM image of the coating containing 2 wt % F80SD1 micro-capsules gelled at 345° F. The diameters of the micro-capsules shown in FIG. 10 are about 100 μm and are roughly the same size as the micro-capsules gelled at 385° F. shown in FIG. 5. The partial expansion of the micro-capsules shown in FIG. 9 compared to the fully expanded micro-capsules shown in FIG. 5 and FIG. 10 confirm that the gel temperature of 300° F. is below the optimum expansion temperature of 320–338° F. for the F80SD1 micro-capsules.

Figure 11:
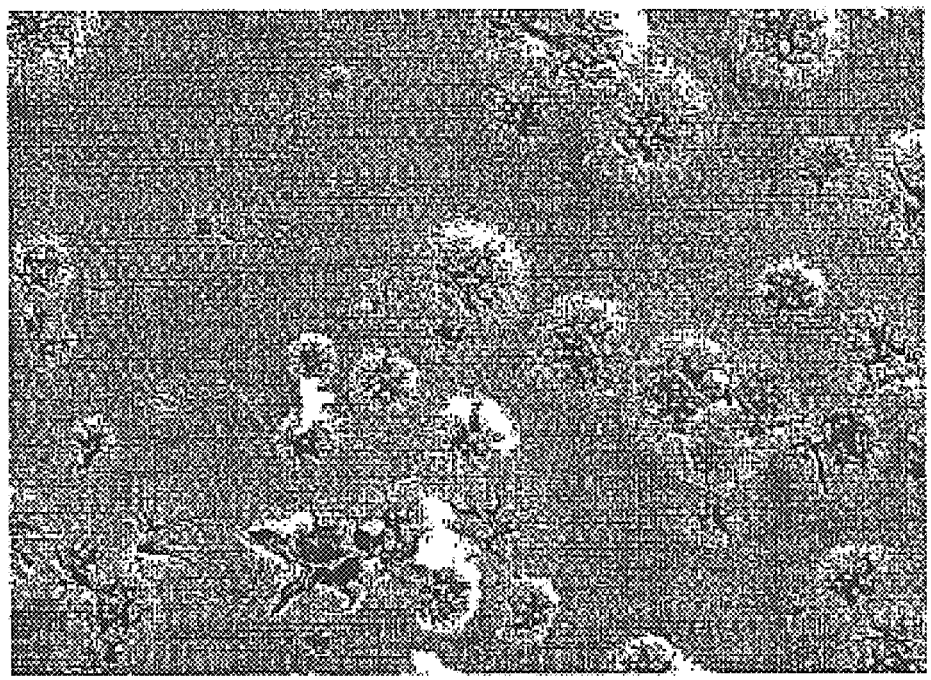
FIG. 11 is a SEM image of a wear layer with 4% F30D micro-capsules according to the present invention.
Figure 12:
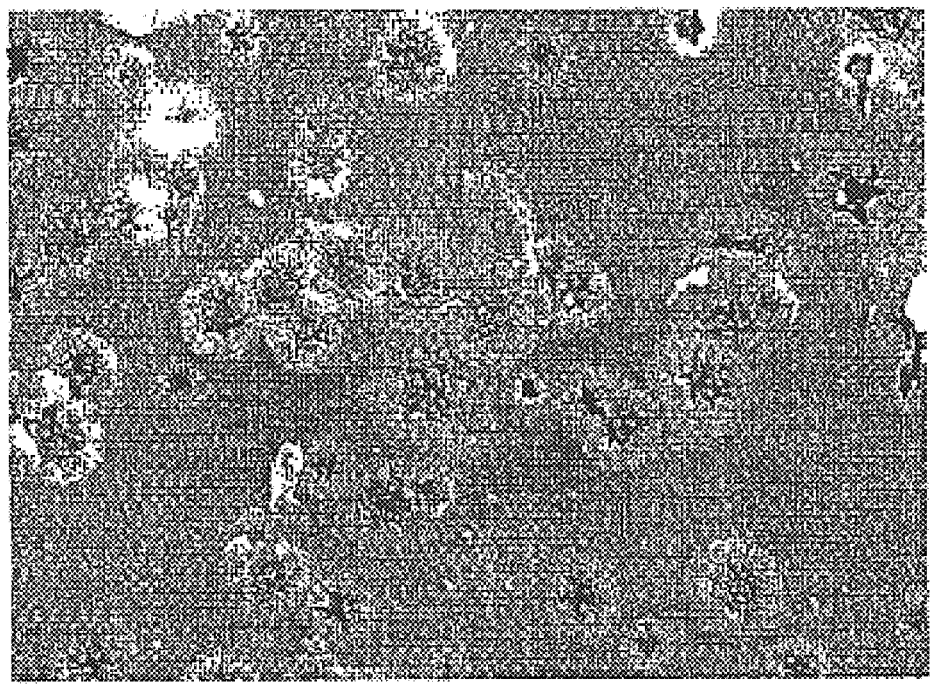
FIG. 12 is a SEM image of a wear layer with 4% F30D micro-capsules according to the present invention.

FIG. 11 is an SEM image of the coating containing 4 wt % F30D micro-capsules gelled at 300° F. FIG. 12 is an SEM image of the coating containing 4 wt % F30D micro-capsules gelled at 345° F. FIG. 11 and FIG. 12 exhibit craters similar to the craters shown in FIG. 8 of a 4 wt % F30D coating gelled at 385° F. The presence of craters and the absence of micro-capsules suggest that the micro-capsules exploded during gel heat treatment and confirms that the gel temperature of 300° F. was above the optimum expansion temperature of 248–284° F. for the F30D micro-capsules.

Table 3 indicates that as the gel temperature increased from 300° F. to 385° F., the aggressiveness of the coatings containing 1 wt % F50D micro-capsules decreased. This trend is explained by considering the gel temperature in relation to the optimum expansion temperature of 284° F. for the F50D micro-capsules. A gel temperature of 300° F. is only slightly above the optimum expansion temperature of 284° F. so all the micro-capsules fully expand to give the most aggressive coating texture. As the gel temperature was increased to 345° F., some of the F50D micro-capsules exploded leaving behind a matte-like texture. At a gel temperature of 385° F., the large temperature excess over the optimum expansion temperature caused all the F50D micro-capsules to explode and leave behind a visibly smooth surface texture.

Table 3 indicates that as the gel temperature increased from 300° F. to 385 ° F., the aggressiveness of the coatings containing 1 wt % F100D1 micro-capsules increased. This trend is explained by considering the gel temperature in relation to the optimum expansion temperature of 356–374° F. for the F100D1 micro-capsules. The gel temperature of 300° F. was below the optimum expansion temperature of about 365° F. so none of the micro-capsules expanded resulting in a smooth coating texture. A gel temperature of 345° F. was still below, but sufficiency close to, the optimum expansion temperature such that some of the F100D1 micro-capsules were able to partially expand resulting in a more aggressive coating texture. A gel temperature of 385° F., which was slightly above the optimum expansion temperature for the F100D1 micro-capsules, allow full expansion of all the micro-capsules and resulted in the most aggressive coating texture.

EXAMPLE 3

This Example demonstrates the effect of depositing a top coat on the textured plastisol coatings. Coatings combining the plastisol with micro-capsules of various types and concentrations were prepared following the same procedure used in Example 1. For each of the coatings prepared, a urethane top coat was applied to a portion of the prepared coatings followed by an evaluation of each of the coating surfaces. The top coat was applied by spreading a UV-curable urethane such as Photoglaze U361, available from Lord Corporation of Cary, N.C., on each of the coatings of Example 1. An air knife was used to produce a wet coating thickness of 1–1.5 mil. The urethane top coat was cured in air under two 125 W/in$^2$ lamps at 100 feet-per-minute (fpm) followed by a second cure under nitrogen under two 300 W/in$^2$ lamps at 100 fpm.

Table 4 summarizes the gloss values of the coatings. Table 4 shows that the top coat slightly reduced the surface texture of all the coated plastisols, as indicated by the slightly larger gloss values for the surfaces with the top coat. Visual examination of the top-coated surfaces, however, showed that the top-coated surface visually retained the ceramic-like texture of the uncoated plastisol.

TABLE 4

| Gloss Values of Coated and Uncoated Textured Plastisols | | |
|---|---|---|
| Plastisol | Top coating | Gloss (at 60°) % |
| 2% F80SD1 | NO | 4.1 |
| 2% F80SD1 | YES | 10 |

EXAMPLE 4

This Example describes the use of thermally expanding micro-capsules in a radiation curable, thermosetting top coat. In this example, 1 g of F-80SD1 micro-capsules was mixed into 99 g of a commercial urethane acrylate top coat such as Photoglaze U361, available from Lord Corporation of Cary, N.C., using a Cowles blade mixer at room temperature. This mixture was applied to a vinyl tile substrate using a 3 mil draw bar. The resulting wet coating was smooth and shiny. The coated sample was placed under IR heaters and surface temperature monitored with an IR probe. Ceramic-like macro-texture appeared on the coating surface when the temperature reached about 225–250° F. The coated tile was passed through a UV processor at 100 fpm with two 300 Watt/in$^2$ H-bulbs under a nitrogen atmosphere having less than 100 ppm 0$_2$. The cured solid coating had permanent ceramic-like texture with a gloss value of 14% at 60° F.

A control coating without the micro-capsules was made following the same procedure used to make the above-described coating. The control coating had a smooth surface and a gloss value of 85% to 90%.

EXAMPLE 5

This example provides another embodiment for the formation of surface texture by adding micro-capsules to a thermally-curing, thermosetting top coating. An amino resin coating was prepared by mixing 50 g of a melamine resin such as Cymel 327, available from Cytec Industries Inc., West Patterson, N.J., 50 g of a capralactone-based triol such as TONE 310, available from The Dow Chemical Company, Midland, Mich., and 3 g of an alkyl phosphate ester catalyst such as Cycat 296-9, available from Cytec Industries Inc., West Patterson, N.J.

Two grams of F80DS1 micro-capsules were added to the mixture and mixed at room temperature with a Cowles blade mixer. The mixture was applied as a coating onto a glass substrate using a three mil draw bar. A control mixture made without the micro-capsules was applied as a coating on a second glass substrate using a three mil draw bar. Both coating were thermally cured at about 320° F. for about 20 minutes. The coating without micro-capsules formed a smooth coating having a gloss value of about 90%. In contrast, the coating with the micro-capsules had a ceramic like texture and a gloss value of 44%.

EXAMPLE 6

Figure 13:
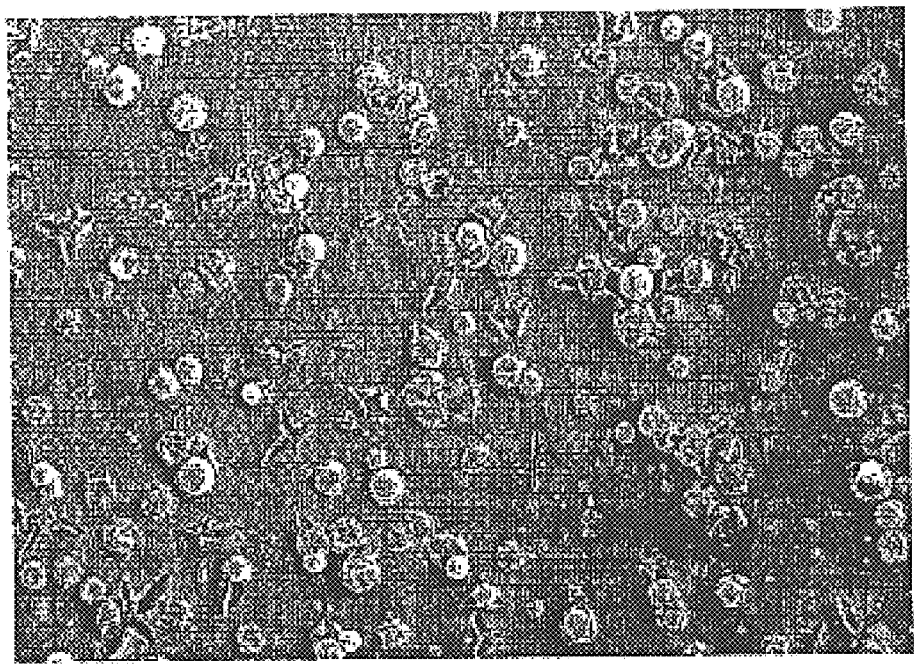
FIG. 13 is a free film of 1% F80SD1 micro-capsules in a gelled wear layer according to the present invention.

This example demonstrates the ability of the micro-capsules to "survive" a standard lamination. F80SD1 micro-capsules were mixed at a 1% concentration into the plastisol in a Cowles blade mixer at a room temperature. The mixture was coated on silicone rubber using a draw bar at wet film thicknesses of 5, 10, 15, and 30 mils. The wet films were gelled at 385° F. for 1.5 minutes and separated from the silicone rubber to yield free gelled films. FIG. 13 shows a SEM image of the top surface of the 10 mil film, which resembles the surface of the Example 1 coating shown in FIG. 4.

The free films were cut into 12 in. ×12 in. squares. The cut films were laminated on the top surfaces of rigid vinyl tile bases by placing a cut film on a tile base and sandwiching the cut film and tile base between two metal plates. The sandwich assembly was placed in a heated press, where both the top and bottom plates of the press were held at 260° F. under a pressure of 10 psi for 5 minutes. Upon completion of the heating cycle, the press was opened and the sample removed and allowed to cool.

Figure 14:
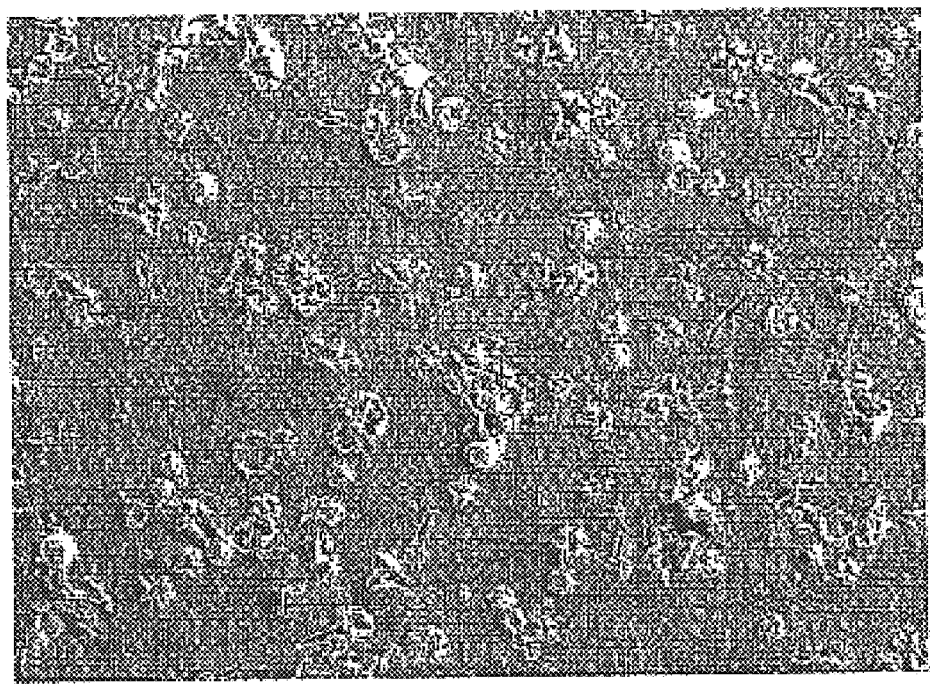
FIG. 14 is a free film of 1% F80SD1 micro-capsules in a laminated and gelled wear layer according to the present invention.

FIG. 14 is a SEM image of the tile surface made with the free film shown in FIG. 13. FIG. 14 shows flattening of some of the micro-capsules from the lamination process but a large portion of the micro-capsules remained completely or partially intact. The tile surface exhibited a ceramic-like texture for all of the film thicknesses used.

The present invention has now been described in connection with a number of particular embodiments thereof. Additional variations should now be evident to those skilled in the art, and are contemplated as falling within the scope of the invention, which is limited only by the claims appended hereto and equivalents thereof.

What is claimed is:

1. A coating mixture which cures to a texture, comprising:
   a surface coating composition and
   a plurality of micro-balloons, each of the plurality of micro-balloons having a polymer shell encapsulating a blowing agent, the plurality of micro-balloons comprising 0.1–4 wt % of said coating mixture.

2. The coating mixture in claim 1 wherein said surface coating composition is a thermoplastic.

3. The coating mixture in claim 2 wherein said thermoplastic is a PVC plastisol.

4. The coating mixture in claim 1 wherein said surface coating composition is thermosetting.

5. The coating mixture in claim 4 wherein said thermosetting surface coating composition is radiation-curable.

6. The coating mixture in claim 1 wherein the shell of said micro-balloons is selected from the group consisting of acrylonitrile and polyvinylidene flouride copolymers.

7. The coating mixture in claim 1 wherein the gas of said micro-balloons comprises a hydrocarbon.

8. The coating mixture in claim 1 wherein said microballoons range from 5–80 μm in diameter.

9. A textured coating, comprising:
   a surface coating and
   a plurality of thermally expanded micro-balloons with a polymer shell and expanded gas, the micro-balloons making up 0.1–4 wt % of said textured coating,
   wherein at least some of said micro-balloons protrude above said surface coating resulting in a texture.

10. The textured coating in claim 9 wherein said texture is like that of sandpaper.

11. The textured coating in claim 9 wherein said surface coating is a thermoplastic.

12. The textured coating in claim 11 wherein said thermoplastic is a PVC plastisol.

13. The textured coating in claim 12 wherein said PVC plastisol is 10–50 mils thick.

14. The textured coating in claim 9 wherein said surface coating is thermoset.

15. The textured coating in claim 14 wherein said thermoset surface coating is radiation-cured.

16. The textured coating of claim 15 wherein said radiation-cured surface coating is 10–100 μm thick.

17. The textured coating in claim 9 wherein the shell of said microballoons is selected from the group consisting of acrylonitrile and polyvinylidene flouride copolymers.

18. The textured coating in claim 9 wherein the gas of said micro-balloons comprises a hydrocarbon.

19. The textured coating in claim 9 wherein said microballoons range from 7.5–1200 μm in diameter.

20. The textured coating in claim 9 further comprising a top coating above said surface coating.

21. The textured coating in claim 20 wherein said top coating is a thermoset coating.

22. The textured coating in claim 21 wherein said thermoset top coating is radiation-cured.

23. A heat-activated coating composition comprising:
   a liquid carrier; and
   a plurality of micro-capsules dispersed in the liquid carrier, each of the plurality of the micro-capsules comprising a blowing agent encapsulated by a thermoplastic resin that forms a substantially gas impermeable barrier enclosing the blowing agent
   wherein the liquid carrier is a PVC plastisol characterized by a gelation temperature range and be a fusion temperature range and
   the microcapsules are characterized by an expansion temperature image that does not exceed the gelation temperature range of the plastisol.

* * * * *